United States Patent
Weksler et al.

(10) Patent No.: US 9,729,710 B2
(45) Date of Patent: Aug. 8, 2017

(54) PRIORITIZED ONGOING COMMUNICATION INTERRUPT

(71) Applicant: Lenovo (Singapore) Pte. Ltd., Singapore (SG)

(72) Inventors: Arnold S. Weksler, Raleigh, NC (US); Russell Speight VanBlon, Raleigh, NC (US); John Carl Mese, Cary, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/284,033

(22) Filed: May 21, 2014

(65) Prior Publication Data

US 2015/0341489 A1  Nov. 26, 2015

(51) Int. Cl.
| | |
|---|---|
| H04M 11/10 | (2006.01) |
| H04M 3/428 | (2006.01) |
| H04W 4/14 | (2009.01) |
| H04M 3/533 | (2006.01) |
| H04M 3/20 | (2006.01) |

(52) U.S. Cl.
CPC ........... *H04M 3/4288* (2013.01); *H04M 3/20* (2013.01); *H04M 3/533* (2013.01); *H04M 3/53308* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 8,254,970 B1 * | 8/2012 | Oshinsky | H04W 88/02 455/458 |
| 8,467,514 B1 * | 6/2013 | Makhmudov et al. | 379/201.1 |
| 8,532,627 B1 * | 9/2013 | Nassimi | 455/412.2 |
| 2002/0131399 A1 * | 9/2002 | Philonenko | H04L 29/06 370/351 |
| 2007/0201481 A1 * | 8/2007 | Bhatia | H04L 65/80 370/395.2 |
| 2008/0085687 A1 * | 4/2008 | Brekke | H04M 1/663 455/187.1 |
| 2011/0209181 A1 * | 8/2011 | Gupta | H04N 7/163 725/62 |

* cited by examiner

*Primary Examiner* — Idowu O Osifade
(74) *Attorney, Agent, or Firm* — Schwegman Lundberg & Woessner, P.A.

(57) ABSTRACT

A method including receiving an interrupt originating associated with an interrupting entity during an ongoing communication between a user and a current entity, determining if the interrupting entity has a higher priority than the current entity, interrupting the user if the interrupting entity has a higher priority than the current entity, and not interrupting the user if the interrupting entity has a lower priority than the current entity.

20 Claims, 2 Drawing Sheets

PRIORITIZED ONGOING COMMUNICATION INTERRUPT

BACKGROUND

Phones that have call waiting are subject to multiple interruptions during a phone call. While call waiting can be suspended for selected calls, a user of the phone has no notification if someone is attempting to reach them.

SUMMARY

A method includes receiving an interrupt associated with an interrupting entity during an ongoing communication between a user and a current entity, determining if the interrupting entity has a higher priority than the current entity, interrupting the user if the interrupting entity has a higher priority than the current entity, and not interrupting the user if the interrupting entity has a lower priority than the current entity.

In further embodiments, the code to cause a computer to implement the method may be stored on a computer readable storage device. A system may also include a memory device containing a program to execute the method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, an ongoing communication between two parties is interrupted if a higher priority communication is received. Interrupting entities such as callers may be listed in groups having differing priorities. Parties in a priority group higher than a current party may interrupt a user to indicate that a higher priority party is attempting to get the attention of the user.

Figure 1:
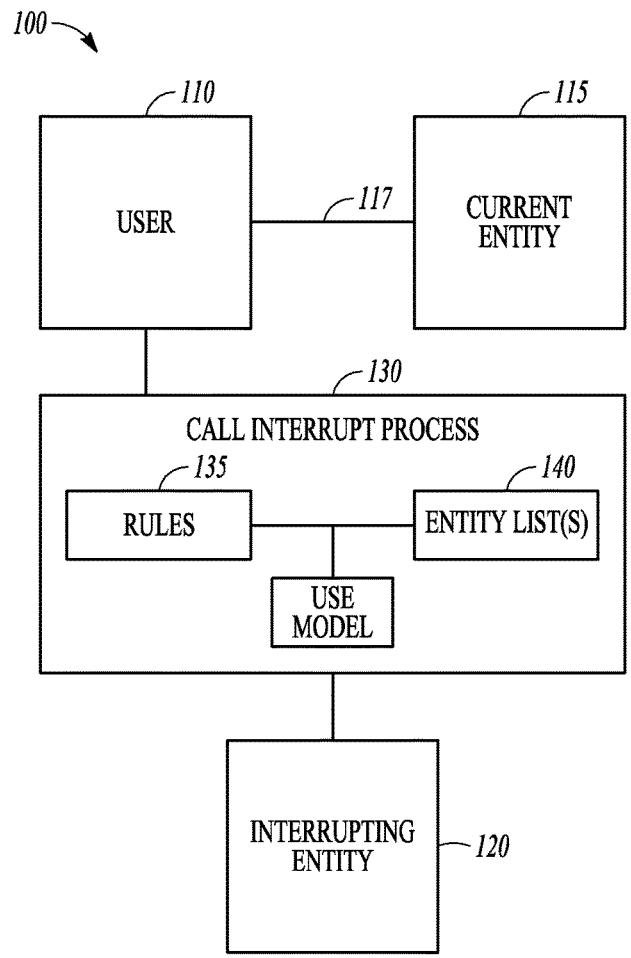
FIG. 1 is a block diagram representation of a system to intelligently interrupt a call to a user based on priority of an interrupting entity according to an example embodiment.

FIG. 1 is a block diagram illustrating an example 100. A user and associated user device 110 is illustrated as speaking to a current entity and associated current entity device 115 via a phone connection 117. User device 110 may include a smart phone connected via a cellular connection 117 or other communication device, such as land line based device, tablet device, personal computer, or any other communication device providing voice and/or video communications or text based communications.

An interrupting entity device 120 may be used by another party or may even represent an alert from a computer process, an executing application, a text message, or other type of communication. An ongoing communication interrupt process, referred to as a call interrupt process 130, that may be operating on user device 110 or a server includes a set of rules 135 and one or more entity lists or groups 140. While some examples are described in terms of a telephone call, the examples may also be representative of other types of ongoing communications, such as ongoing text messaging, video conference, or a chat session between two entities.

When the interrupting device 120 attempts to call or otherwise communicate with user device 110, the call interrupt process 130 receives the call and applies the rules 135 in association with the groups 140 determines whether or not to interrupt the user via user device 110 notifications. In one embodiment, each group is assigned a priority level. A user may identify users or groups of users to place in each group. Sets of users may be identified via three digit area code, area code and four digit station number in the US, or other sets of codes in other countries, including country codes. Using such codes allows a user to set a priority level for a company, such as a good customer. Selection of individual entities for groups allows a user to select individuals that are important, such as family members, or someone from whom an important call or message is expected. Interrupting entities not on a list may default to a lowest priority level in some embodiments.

In one embodiment, the notifications may be suppressed for lower priority interrupting entities. Suppression of a notification may involve reducing the volume of an interrupt tone, eliminating the interrupt tone, notifying visually or vibration, or other measures designed to reduce or minimize the effect of a notification on the user speaking to a higher priority entity.

Rules may be created prior to or while on a call, text session, or other ongoing communication in various embodiments. A rule may or may not utilize an entity list. One rule may be to interrupt a current call if a specific person attempts to contact the user. Further rules may be added for specific lists of people in which a specific user may be interrupted. Rules may also designate groups that can interrupt other groups based on time of day. For instance, one rule may indicate that family members may interrupt all calls after normal working hours, or based on certain user locations. Location information may be entered by a user, or obtained from global position system (GPS) location data, with applicable rules specified by the user. If rules conflict, a first encountered dispositive rule may be applied without regard to further rules in one embodiment. Other conflict resolution constructs may be used in further embodiments.

In further embodiments, the call interrupt process 130 may generate rules, or move people to a group, based on past user behavior in accepting or ignoring calls via a use model module 145. The use model module 145 may monitor calls and interrupting entity attempts as well as whether the user accepts the interruptions. If a user has routinely ignored calls from a particular interrupting entity regardless of current entity, that particular entity may be placed in a low priority group by the use model module 145. Similarly, interrupting entities that are routinely switched to may be placed by the call interrupt process into a higher priority group. Individual rules may instead be used to determine whether or not to interrupt a call.

Figure 2:
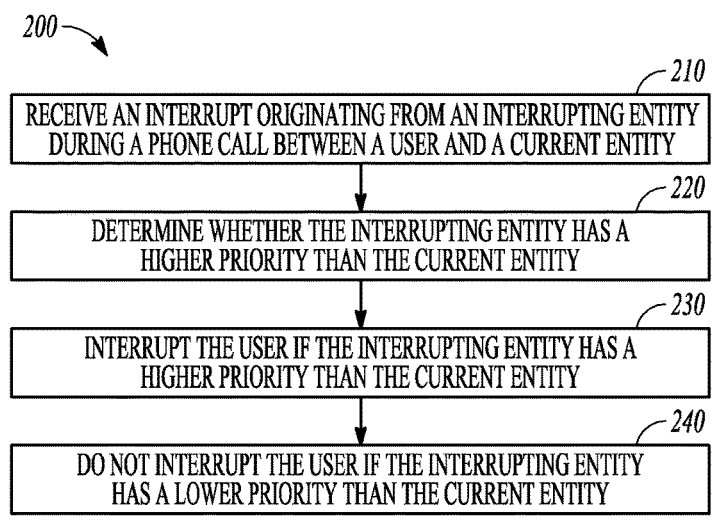
FIG. 2 is a flowchart illustrating a method of interrupting a phone call according to an example embodiment.

FIG. 2 is a flowchart illustrating method 200 of handling interruptions during a phone call. At 210 an interrupt originating from an interrupting entity is received during a phone call between a user and a current entity. At 220, a determination is made regarding whether the interrupting entity has a higher priority than the current entity. The user is interrupted at 230 if the interrupting entity has a higher priority than the current entity. At 240, the user is not interrupted if the interrupting entity has a lower priority than the current entity.

In one embodiment, entities are listed in groups having varying priority. Determining if the interrupting entity has a higher priority than the current entity comprises identifying the group each entity is in and retrieving the corresponding group priorities. The entities may be placed into groups as a function of prior user choices when responding to interrupting entity interrupts.

In a further embodiment, an interrupting caller having a same priority as the current entity results in the user being interrupted. Interrupting the user may include providing an audio notification and not interrupting the user may include not providing an audio notification. A priority may change as a function of time of day.

An interrupting entity may include a person trying to call the user. If the interrupting entity call does not result in the user being interrupted, the caller may be placed directly into voicemail, and a voicemail status audio notification may be delayed until the current entity phone call is done. The interrupting entity may also include a person sending a text message to the user, or may include software executing on a processor attempting to notify the user of an event, such as a low or critically low battery, which may have differing priority levels. In one embodiment, an interrupting entity having at least one of a selected country code, area code, and station number.

The user may select whether or not to utilize the call interrupt process during the phone call in some embodiments. Interrupting entities selected by a user may be assigned a higher priority than a user identified current entity. Further, the priority of a current entity may be changeable by the user during the phone call.

Figure 3:
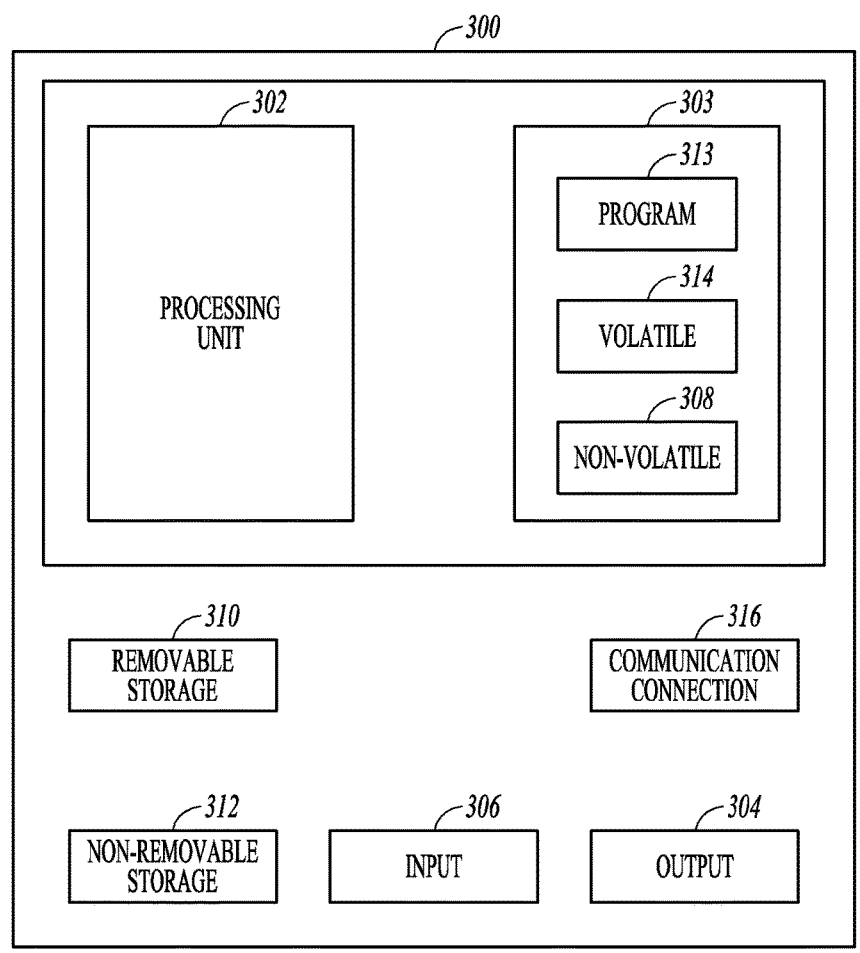
FIG. 3 is a block diagram of computer system used to implement methods according to an example embodiment.

FIG. 3 is a block schematic diagram of a computer system 300 to perform one or more methods according to example embodiments. All components need not be used in various embodiments. One example computing device in the form of a computer 300, may include a processing unit 302, memory 303, removable storage 310, and non-removable storage 312. Sensors 115 and 125 may be coupled to provide data to the processing unit 302. Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 306, output 304, and a communication connection 316. Output 304 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular network, or other networks.

Computer-readable instructions stored on a computer-readable medium are executable by the processing unit 302 of the computer 300. A hard drive, CD-ROM, and RAM are some examples of articles including a non-transitory computer-readable medium. For example, a computer program 318 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 300 to provide generic access controls in a COM based computer network system having multiple users and servers.

EXAMPLES

1. A method comprising:
receiving an interrupt associated with an interrupting entity during an ongoing communication between a user and a current entity;
determining if the interrupting entity has a higher priority than the current entity;
interrupting the user if the interrupting entity has a higher priority than the current entity; and
not interrupting the user if the interrupting entity has a lower priority than the current entity.

2. The method of example 1 wherein entities are listed in groups having varying priority, and wherein determining if the interrupting entity has a higher priority than the current entity comprises identifying a group associated with each entity and retrieving the corresponding group priorities.

3. The method of example 2 wherein entities are placed into groups as a function of prior user choices when responding to interrupting entity interrupts.

4. The method of any of examples 2-3 wherein an interrupting caller having a same priority as the current entity results in the user being interrupted.

5. The method of any of examples 1-4 wherein the ongoing communication comprises a phone call and wherein interrupting the user comprises providing an audio notification and not interrupting the user comprises not providing an audio notification.

6. The method of any of examples 1-5 wherein a priority changes as a function of time of day.

7. The method of any of examples 1-6 wherein an interrupting entity comprises a person trying to call the user.

8. The method of any of examples 1-7 the ongoing communication comprises a phone call, and wherein not interrupting the user comprises placing a caller directly into voicemail and not providing a voicemail status audio notification until the current entity phone call is finished.

9. The method of any of examples 1-8 wherein an interrupting entity comprises a person sending a text message to the user.

10. The method of any of examples 1-9 wherein an interrupting entity comprises software executing on a processor attempting to notify the user of an event.

11. The method of any of examples 1-10 wherein a group comprises an interrupting entity having one or more of a selected country code, area code, and station number.

12. The method of any of examples 1-11 wherein the method is selectable by a user during the phone call.

13. The method of any of examples 1-12 wherein interrupting entities selected by a user are provided a higher priority than a user identified current entity.

14. The method of any of examples 1-13 wherein the ongoing communication comprises a phone call, and wherein the priority of a current entity is changeable by the user during the phone call.

15. A machine readable storage device having instructions for execution by a processor of the machine to perform:
receiving an interrupt associated with an interrupting entity during an ongoing communication between a user and a current entity;
determining if the interrupting entity has a higher priority than the current entity;
interrupting the user if the interrupting entity has a higher priority than the current entity; and
not interrupting the user if the interrupting entity has a lower priority than the current entity.

16. The machine readable storage device of example 15 wherein entities are listed in groups having varying priority, and wherein determining if the interrupting entity has a higher priority than the current entity comprises identifying the group each entity is in and retrieving the corresponding group priorities.

17. The machine readable storage device of any of examples 15-1 wherein the interrupting entity is calling the user and wherein not interrupting the user comprises placing the interrupting entity directly into voicemail and not providing a voicemail status audio notification until the current entity phone call is done.

18. The machine readable storage device of any of examples 15-17 wherein the priority of a current entity is changeable by the user during the phone call.

19. A device comprising:
a processor; and
a memory device having a program stored thereon for execution by the processor to:
receive an interrupt associated with an interrupting entity during an ongoing communication between a user and a current entity;
determine if the interrupting entity has a higher priority than the current entity;
interrupt the user if the interrupting entity has a higher priority than the current entity; and
not interrupt the user if the interrupting entity has a lower priority than the current entity.

20. The device of example 19 wherein entities are listed in groups having varying priority, and wherein determining if the interrupting entity has a higher priority than the current entity comprises identifying the group each entity is in and retrieving the corresponding group priorities.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving a change of priority of a current entity during an ongoing phone call between a user and the current entity;
receiving an interrupt associated with a communication from an interrupting entity attempting to communicate with the user during the ongoing phone call between a user and a current entity, wherein the interrupt identifies the interrupting entity with an entity identifier;
determining via a programmed computer if the interrupting entity has a higher priority than the current entity by using an entity identifier for both the current entity and the interrupting entity to determine respective priorities of the entities;
interrupting the user if the interrupting entity has a higher priority than the current entity by notifying the user about the interrupt; and
not interrupting the user if the interrupting entity has a lower priority than the current entity.

2. The method of claim 1 wherein entities are listed in groups having varying priority, and wherein determining if the interrupting entity has a higher priority than the current entity comprises identifying a group associated with each entity and retrieving the corresponding group priorities.

3. The method of claim 2 wherein entities are placed into groups as a function of prior user choices when responding to interrupting entity interrupts.

4. The method of claim 2 wherein an interrupting caller having a same priority as the current entity results in the user being interrupted.

5. The method of claim 1 and wherein interrupting the user comprises providing an audio notification and not interrupting the user comprises not providing an audio notification.

6. The method of claim 1 wherein a priority changes as a function of time of day, and the interrupting of the user varies as a function of time of day according to the priority changes.

7. The method of claim 1 wherein an interrupting entity comprises a person having attempted a phone call the user.

8. The method of claim 1 wherein the ongoing communication comprises a phone call, and wherein not interrupting the user comprises placing a caller directly into voicemail and not providing a voicemail status audio notification until the current entity phone call is finished.

9. The method of claim 1 wherein an interrupting entity comprises a person sending a text message to the user.

10. The method of claim 1 wherein an interrupting entity comprises software executing on a processor attempting to notify the user of an event.

11. The method of claim 1 wherein a group comprises an interrupting entity having one or more of a selected country code, area code, and station number.

12. The method of claim 1 wherein the method is selectable by a user during the phone call.

13. The method of claim 1 wherein interrupting entities selected by a user are provided a higher priority than a user identified current entity.

14. The method of claim 1 further comprising receiving during a phone call a selection of whether to utilize the call interrupt process during the phone call.

15. A non-transitory machine readable storage device having instructions for execution by a processor of the machine to perform operations comprising:
receiving a change of priority of a current entity during an ongoing phone call between a user and the current entity;
receiving, at the processor, an interrupt associated with a communication from an interrupting entity attempting to communicate with the user during a phone call between the user and the current entity, wherein the interrupt identifies the interrupting entity with an entity identifier;
determining, via the processor, if the interrupting entity has a higher priority than the current entity by using an entity identifier for both the current entity and the interrupting entity to determine respective priorities of the entities;
interrupting the user, via the processor, if the interrupting entity has a higher priority than the current entity by notifying the user about the interrupt; and
not interrupting the user if the interrupting entity has a lower priority than the current entity.

16. The non-transitory machine readable storage device of claim 15 wherein entities are listed in groups having varying priority, and wherein determining if the interrupting entity has a higher priority than the current entity comprises identifying the group each entity is in and retrieving the corresponding group priorities.

17. The non-transitory machine readable storage device of claim 15 wherein the interrupting entity is calling the user and wherein not interrupting the user comprises placing the interrupting entity directly into voicemail and not providing a voicemail status audio notification until the current entity phone call is done.

18. The non-transitory machine readable storage device of claim 15 wherein the non-transitory machine readable storage device further includes instructions for execution by a processor of the machine to perform operations to receive during a phone call a selection of whether to utilize the call interrupt process during the phone call.

19. A device comprising:
a processor; and
a memory device having a program stored thereon for execution by the processor to:
receiving a change of priority of a current entity during an ongoing phone call between a user and the current entity;
receive an interrupt associated with a communication from an interrupting entity attempting to communicate with the user during a phone call between the user and the current entity, wherein the interrupt identifies the interrupting entity with an entity identifier;
determine if the interrupting entity has a higher priority than the current entity by using an entity identifier for both the current entity and the interrupting entity to determine respective priorities of the entities;
interrupt the user with a notification if the interrupting entity has a higher priority than the current entity; and
not interrupt the user if the interrupting entity has a lower priority than the current entity.

20. The device of claim 19 wherein entities are listed in groups having varying priority, and wherein determining if the interrupting entity has a higher priority than the current entity comprises identifying the group each entity is in and retrieving the corresponding group priorities.

* * * * *